(12) United States Patent
Hauser (10) Patent No.: US 8,838,786 B2
(45) Date of Patent: *Sep. 16, 2014

(54) SYSTEM, METHOD AND COMPUTER READABLE MEDIUM FOR DETERMINING AN EVENT GENERATOR TYPE

(75) Inventor: Robert R Hauser, Frisco, TX (US)

(73) Assignees: Suboti, LLC, Frisco, TX (US); Paul A Lipari, Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/287,233

(22) Filed: Nov. 2, 2011

(65) Prior Publication Data

US 2012/0047256 A1    Feb. 23, 2012

Related U.S. Application Data

(63) Continuation of application No. 12/435,740, filed on May 5, 2009.

(51) Int. Cl.

| | |
|---|---|
| *G06F 15/173* | (2006.01) |
| *G06F 15/16* | (2006.01) |
| *G06F 11/00* | (2006.01) |
| *G06F 15/18* | (2006.01) |
| *H04L 29/06* | (2006.01) |
| *G06F 21/31* | (2013.01) |
| *G06F 21/36* | (2013.01) |

(52) U.S. Cl.
CPC .......... *H04L 63/083* (2013.01); *G06F 21/316* (2013.01); *G06F 21/36* (2013.01); *G06F 2221/2119* (2013.01); *G06F 2221/2115* (2013.01)
USPC ................ 709/224; 709/231; 726/22; 706/12

(58) Field of Classification Search
CPC .................. G06F 21/316; G06F 21/36; G06F 2221/2115; G06F 2221/2119; H04L 63/083
USPC ................ 709/220, 224, 231; 726/22; 706/12
See application file for complete search history.

(56) References Cited

U.S. PATENT DOCUMENTS

| | | | | |
|---|---|---|---|---|
| 6,161,130 | A * | 12/2000 | Horvitz et al. | ................ 709/206 |
| 6,848,108 | B1 | 1/2005 | Caron | |
| 7,051,042 | B2 | 5/2006 | Krishnaprasad et al. | |
| 7,725,395 | B2 * | 5/2010 | Rui et al. | ........................ 705/50 |

(Continued)

FOREIGN PATENT DOCUMENTS

WO    WO 2008091675  A1 *  7/2008

OTHER PUBLICATIONS

Florian Mueller, Andrea Lockerd, "Cheese: Tracking Mouse Movement Activity on Websites, a Tool for User Modeling", Conference on Human Factors in Computing Systems, CHI '01 extended abstracts on Human factors in computing systems, Seattle, Washington, Session: Short talks: of mice and measures, pp. 279-280, Year of Publication: 2001, ISBN: 1-58113-340-5, MIT Media Lab, 2001, Cambridge, MA 02139 USA.

*Primary Examiner* — Brian J Gillis (57) ABSTRACT

Human interaction with a webpage may be determined by processing an event stream generated by the client device during the webpage interaction. A classification server receives the event stream and compares components of the event stream, including components of an event header message, with prerecorded datasets. The datasets include prerecorded event streams having a known interaction type. Training clients may be provided for generating the prerecorded datasets.

17 Claims, 7 Drawing Sheets

(56) References Cited

U.S. PATENT DOCUMENTS

| | | | |
|---|---|---|---|
| 2009/0044264 A1* | 2/2009 | Ramanathan et al. | 726/14 |
| 2009/0094311 A1* | 4/2009 | Awadallah et al. | 709/202 |
| 2009/0327913 A1* | 12/2009 | Adar et al. | 715/745 |
| 2010/0070620 A1* | 3/2010 | Awadallah et al. | 709/224 |

* cited by examiner

SYSTEM, METHOD AND COMPUTER READABLE MEDIUM FOR DETERMINING AN EVENT GENERATOR TYPE

CROSS-REFERENCE TO RELATED APPLICATIONS

This application is a continuation of and claims priority from U.S. patent application Ser. No. 12/435,740 filed on May 5, 2009, entitled SYSTEM, METHOD AND COMPUTER READABLE MEDIUM FOR DETERMINING AN EVENT GENERATOR TYPE; this application is incorporated herein by reference in its' entirety.

FIELD OF THE INVENTION

This invention relates to a system, method and computer readable medium for detection of human generated computer user interface events.

BACKGROUND OF THE INVENTION

In many web based applications, it may be necessary to verify that a human is using a computer, rather than an automated computer program, as one example. One well known solution for use with web based forms, is to use an application such as CAPTCHA (Completely Automated Public Turing test to tell Computers and Humans Apart). A CAPTCHA is a type of challenge-response test presented on screen to determine if the user is a human. A problem with using CAPTCHAs is that they can be automatically solved by computer algorithms. Further, humans can be used to solve CAPTCHAs the first time, with the response being recorded with the original challenge so if the same challenge is reused later a computer program can respond without assistance from a human. CAPTCHAs can be annoying to users and can typically only be used at predetermined locations within an application (e.g. a web form during user logon).

An alternative solution, often used in video games is to insert random events. Random events interrupt some otherwise predictable order of events by presenting new activities to the player/user. These are usually used to discourage players from using automated means to artificially gain experience within a gaming environment. Random events are annoying to users/players unless well crafted within the web page/game. Random events do not occur at predetermined locations but may require ongoing background analysis to estimate when a user/player may be using automated means of control.

What is required is a system, method and computer readable medium that can determine whether user interface events are human generated.

SUMMARY OF THE INVENTION

In one aspect of the disclosure, there is provided a method for determining an event generator type of an interaction between a client and a web server. In the method an event stream generated by the client during the interaction between the client and the web server is received and then at least a portion of a received event stream is compared with a dataset comprising a plurality of prerecorded event streams having a known event generator type. An event generator type of the received event stream is determined from the comparison.

In one aspect of the disclosure, there is provided a system for classifying an interaction type of an interaction between a client and a web server. The system comprises a classification server, and a prerecorded dataset comprising a plurality of interactions, each interaction comprising an interaction type. The classification server is configured to receive an event stream in respect of the interaction and to classify the interaction using at least one component of the event stream and the prerecorded dataset.

In one aspect of the disclosure, there is provided a computer-readable medium comprising computer-executable instructions for execution by a first processor and a second processor in communication with the first processor, that, when executed cause the first processor to generate an interaction status request in respect of a client and provide the interaction status request to the second processor, and cause the second processor to determine the interaction status of the client from an event stream generated by the client and provide the interaction status to the first processor.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 1:
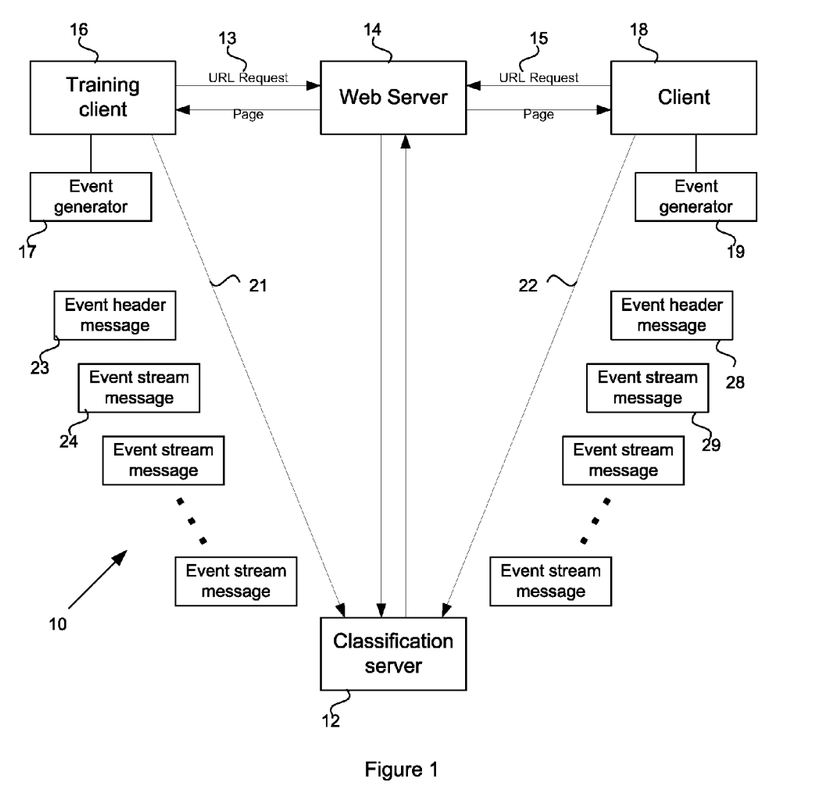
FIG. 1 illustrates a system for determining an interaction type of a webpage interaction.

In FIG. 1, there is shown a system 10 in accordance with an embodiment of the disclosure that may be used for determining whether interface events are generated by humans. The system 10 includes a classification server 12 that interfaces with a web server 14. The web server 14 responds to URL requests 13, 15 from a training client 16 and clients 18 respectively, and in response provides web pages corresponding to the URL requests. Each of the training clients 16 and clients 18 include a respective event generator 17, 19. In the process of requesting and receiving a webpage from the web server 14 and in subsequent interactions on the webpage, the training client 16 and clients 18 may generate an event stream 21, 22. An event stream will typically include an event header message 23 and one or more event stream messages 24. The training client 16 and clients 18 communicate the respective event streams 21, 22 to the classification server 12, which operates to classify an interaction type or interaction status of the interaction between the clients and the web server 14. The originating web server 14 can request the analysis of the event stream from the classification server 12 and will receive an indication of whether the interaction with the web page on the client is human or not.

The training client and client applications may operate on any suitable web enabled device including a PC, laptop, hand held browser, mobile phone, or any other suitable device.

Communications between the components may be provided using wired or wireless devices and using appropriate protocols. The training clients and regular clients do not need to both be simultaneously active.

Figure 2:
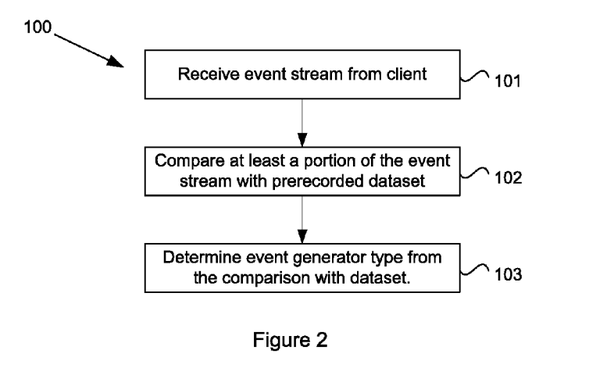
FIG. 2 illustrates a method for determining an event generator type of a web page interaction.

A method for determining an event generator type of an interaction between a client and a web server will now be described with reference to the flowchart 100 of FIG. 2. At step 101, an event stream generated by the client during the interaction between the client and the web server is received at the classification server 12. The classification server 12 compares (step 102) at least a portion of the received event stream with a dataset which includes prerecorded event streams having a known event generator type. At step 103, the classification server 12 determines from the comparison what the event generator type of the received event stream is, thereby determining whether the web page interaction at the client is human generated or not.

In one embodiment the invention transparently and continuously operates within an execution environment (web browser client) without interfering with arbitrary application code that runs within the web page on the client browser. Observed user interface events are sent to the server 12 which provides the service of determining the type of event generator for all events ranges (human vs. non-human).

To perform effective analysis of the event stream and to correctly determine an event interaction type, the classification server 12 must be trained to distinguish human interaction from other types of interaction, e.g. web crawlers or other computer programs that request the page from the web server. Machine learning is used on labeled examples of event stream interaction data. Labeled (known) training examples for machine learning are obtained by controlling the training client 16 so the event generator type can be recorded along with the event stream.

Figure 3:
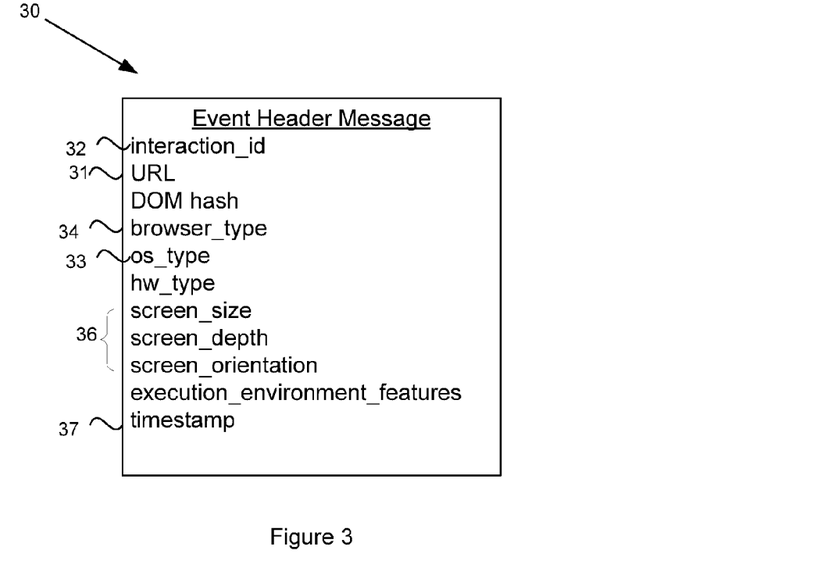
FIG. 3 illustrates an example of an event header message.
Figure 4:
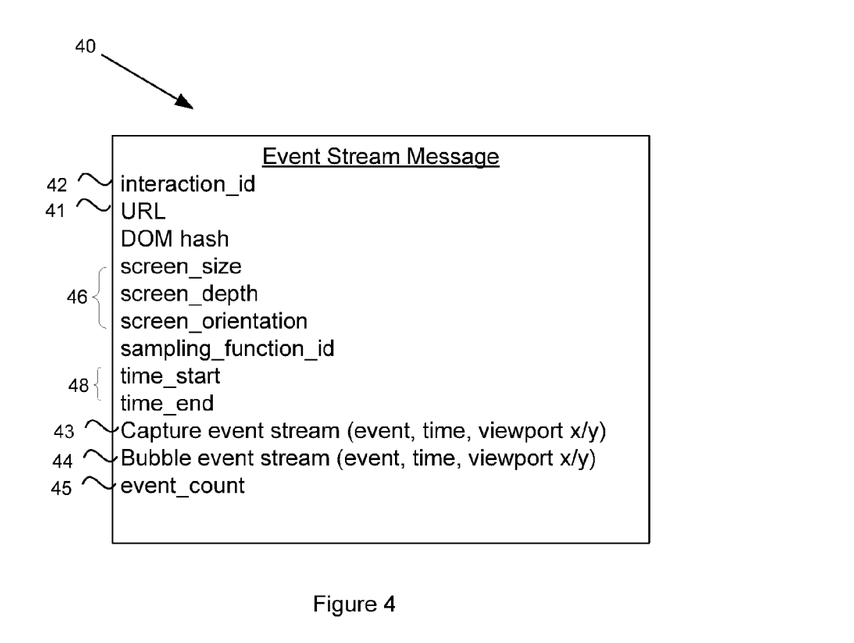
FIG. 4 illustrates an example of an event stream message.

The machine learning makes use of various components of the event header message and the event stream messages. An example of an event header message 30 is illustrated in FIG. 3 and an example of an event stream message 40 is illustrated in FIG. 4. The messages 30, 40 show a number of components that can be included, though in various embodiments, not all of these components may be required and additional components may be added. Primarily, an Interaction_ID 32, 42 uniquely identifies an interaction between the client and the web server and aids to identify a particular event stream. The event header message 30 and the event stream message 40 may also identify the Uniform Resource Locator (URL) 31, 41. Fixed parameters such as the operating system 33 and browser type 34 may form part of the event header message 30. Screen parameters 36, 46 such as the screen size, depth and orientation may be included in either or both of the event header message 30 or the event stream message 40. A capture event stream 43 and a bubble event stream 44 specifies the events recorded in respective event capture and bubbling phases during the web page interaction. Each event may be indicated by the event type, time and x/y location relative to the viewport. An event_count field 45 may indicate the total number of unique events observed by the event observer module including those events not included in the event stream message 40 due to a current sampling function excluding them. Timing parameters 48 may indicate the relevant period over which the event stream message 40 is current. A timestamp field 37 may be used for evaluating time intervals etc.

Figure 5:
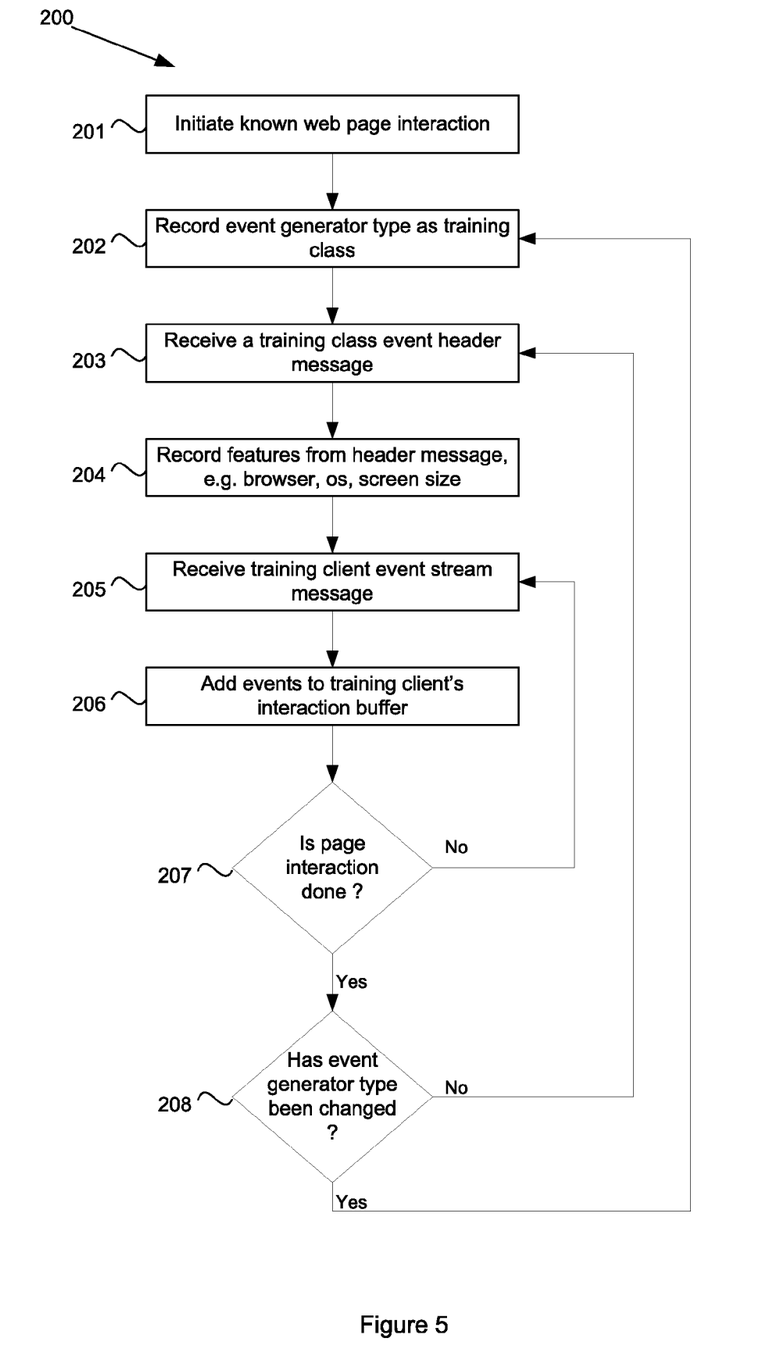
FIG. 5 illustrates a recording phase for creating a dataset.

A recording phase for the system 10 will now be described with reference to FIG. 1 and the flowchart 200 of FIG. 5. At step 201, the training client 16 initiates a known web page interaction with the web page server 14 and records an event generator type 202. The event generator type may be included in a header message, or by a user input, config file etc. The event generator type indicates the type of web page interaction between the training client and the web page server and may be selected from a plurality of event generator types including a human interaction, computer assisted human, computer program, robot or machine, natural act, simulated or a fluctuating input device. The event generator 17 generates an event header message, such as event header message 23 which is received by the classification server 12 at step 203. The classification server 12 records (step 204) features from the event header message such as the browser type, operating system, screen size etc. At step 205, the server 12 receives an event stream message generated by the event generator 17 for the web page interaction, such as event stream message 24. Events are added to an interaction buffer for the training client (step 206). The buffer may be provided in the classification server 12 or elsewhere as required. If the page interaction is not yet complete, as determined by decision tree 207, then the process returns to step 205 and processes the next incoming event stream message from the event generator 17. If the web page interaction is complete, i.e. no more event stream messages, then the process may be repeated for different variations of the web page interaction, such as for a different browser, operating system, training client (e.g. different device type), URL etc. At decision tree 208, if the event generator type has not changed, the process returns to step 203 to handle a new event header message for the repeat web page interaction. If the event generator type has changed, the new event generator type is recorded by returning the process to step 202.

In the recording phase, multiple interactions may be recorded based on different types of clients, e.g. PC, mobile devices, laptops, as well as different operating systems, browsers and event generators (e.g. human, computers, etc). The recording phase may also record many instances for the same parameter set (i.e. client, operating system, browser, event generator) for multiple interactions. For example, the same event generator type may have many instances, such as where two different humans interact differently on the same web page and thus, though the parameter set may be the same, the event streams generated by the human interactions may be different. Event generators may also be sub-typed. For example there may be different classes of human operator, such as a human or a computer assisted human. There may also be different types of computer user. For example, each particular malware program that is attempting to generate human-like event streams may behave differently and thus there may be different data sets used to identify them.

Figure 6:
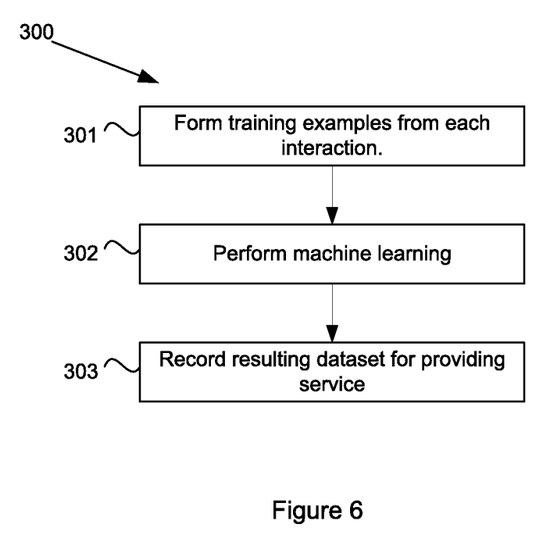
FIG. 6 illustrates a machine learning phase for creating a labeled dataset.

Once sufficient instances have been recorded for a webpage interaction, a learning phase may be provided. The learning phase operates on the classification server 12, as depicted in the flowchart 300 of FIG. 6. At step 301, training examples are formed from the instances recorded during the above described recording phase. The training examples may be classified by the event generator type recorded in the instance. The training example may use features from the event header message record and the event stream message interaction buffer. In particular, the URL, browser type and operating system as these features may be required for determining an event stream. As one example the browser or operating system may alter how many events are delivered to event handler functions during a rapid mouse movement. Primary features for classification will include information derived from the event stream, the event rate, event location, and correlated event features. An example of a correlated event feature typical of human interaction would be the co-occurrence of the mouse tracking to the lowest third of the viewport area followed by a scroll down event (as a human is apparently reading down the page content). At step 302, machine learning is performed to create a dataset of known interactions labeled and classified by the event generator type. The dataset is recorded and stored for later runtime service (step 303). The process of machine learning labels and classifies instances of webpage interactions so that a particular series of events may be deemed to be indicative of a particular class of webpage interaction. The resulting dataset may thus be used in runtime on non-training clients to determine whether webpage interactions are human based or not.

Figure 7:
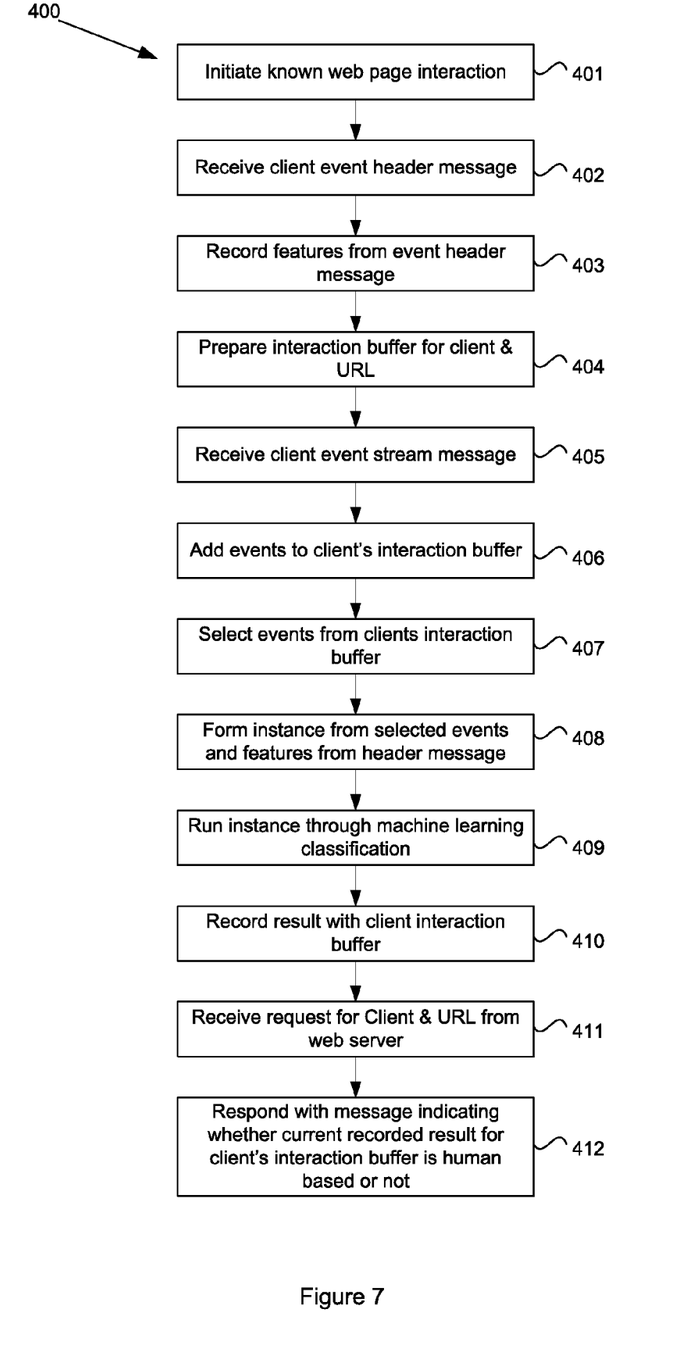
FIG. 7 illustrates a service phase for classification of a webpage interaction in a first embodiment.

A service process for providing runtime service will now be described with reference to FIG. 1 and the flowchart 400 of FIG. 7. At step 401, a webpage interaction commences between the client 18 and the web server 14. The interaction causes the event generator 19 to generate an event header message 28 which is received by the classification server 12 at step 402. At step 403, features of the event header message 28 are recorded and an interaction buffer is prepared for the client and URL (404). As described above, the buffer may be provided as a memory within the server 12 or maybe provided remote of the server.

Event stream messages 29 are then received from the client 18 to the classification server 12 at step 405 and added to the interaction buffer at step 406. At step 407, some of the events are selected from the client's buffer including at least some new events. Using the selected events and features of the event header message 28, an instance is formed at step 408 which is then passed through the machine learning for classification at step 409. In the machine learning step 409, the instance is compared with instances stored in the dataset and generated in the recording and learning phases described above for known interaction types. If the instance matches with a stored instance with a degree of confidence above a threshold, then the instance can be said to correlate to the recorded instance and thus is deemed to be of the same event generator type as the matching recorded instance. The result of the correlation can then be recorded with the client instruction buffer at step 410. At step 411, the web server 14 may request to know the interaction type of the client and URL. The classification server 12 may respond at step 412 with a message indicating whether the current recorded result for the client's interaction buffer indicates a human interaction type or some other interaction type.

Figure 8:
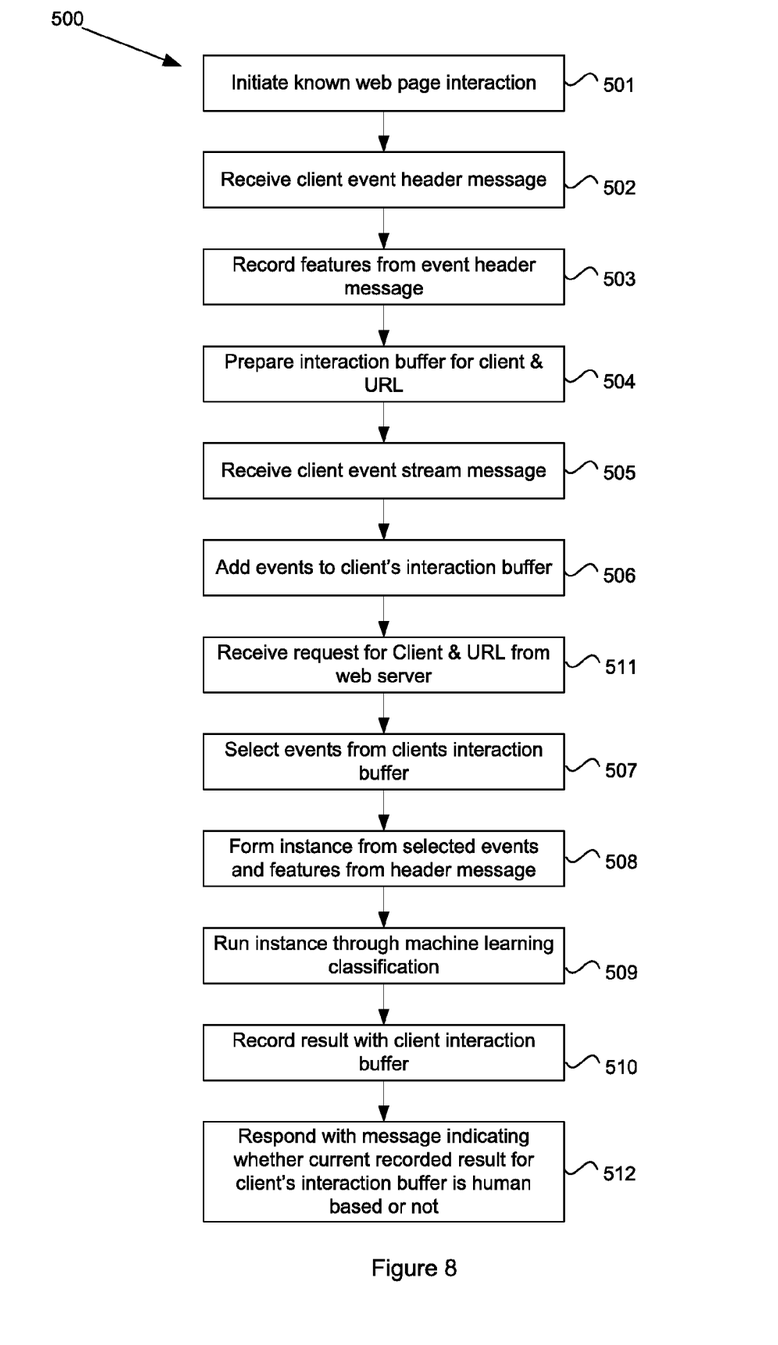
FIG. 8 illustrates a service phase for classification of a webpage interaction in a second embodiment.

The process 400 provides continuous updating of a client interaction buffer to record the current interaction status of an interaction between the client 18 and the web server 14. In an alternative embodiment, depicted in the flowchart 500 of FIG. 8, the interaction status may be provided on demand from the web server 14. In this process, the steps 501-506 and 512 of flowchart 500 are substantially the same as the corresponding steps of the flowchart 400. However, the steps of forming the instance, machine learning and determining the interaction status (steps 507 to 510) occur only in response to a specific request from the web server 14 (step 511).

The events collected from the client during a web page interaction may be the stream of all user interface events or the stream may be comprised of only the user interface events that are not consumed by "application code" that runs within the web page. In addition, the event stream may be a downsampled subset from either of the above cases. That is certain events such as mouse clicks, may be more indicative than other events of the webpage interaction, such as mouse moves.

In one embodiment, the web server 14 and classification server 12 may be the same server. However, when the classification server 12 is not the same machine as the web server 14, the URL and client (e.g. IP address) is not sufficient to identify a single interaction. Several users/browsers/machines may be requesting the same web page from the same server and have the same IP address. The Event Header Message and the Event Stream Message (FIGS. 3 and 4 respectively) may therefore include an "interaction_id" field in order to uniquely identify the particular event streams.

In FIG. 1, the interactions between the clients 18 (including the training client 16), the web server 14 and the classification server 12 are shown as direct interactions. That is, the client 18 directly provides URL requests to the web server 14 which responds directly to the client 18 with the requested page. Similarly, the client 18 directly provides event stream messages to the classification server 12. In alternative embodiments, the interactions may be indirect. For example, the web server 14 may communicate with the clients 18 through the classification server 12, which passes URL requests and webpage information. Alternatively, event stream messages etc may pass from the clients 18 to the classification server 12 via the web server 14.

An advantage of the systems and methods described above over the prior art includes that the verification is transparent to the user and unobtrusive and can provide continual verification and at multiple locations within the application environment.

The systems of the embodiments can operate with arbitrary unmodified web pages and web page application code (e.g. various Javascript code running within a web page), whereas CAPTCHAs and the like can require substantial new coding to incorporate the CAPTCHA algorithm or random events.

In one particular case, a header message may be received but no user interface events received. Many existing programs will behave this way as they start supporting executing JavaScript, that is they will run the JavaScript but they won't have any event generator so no user interface events will be received. When a program with basic JavaScript support downloads a web page a header message is generated with no events. The program then proceeds to download other resources linked from the web page. The web server may look at its clickstream data and see a request for the page followed very quickly by a request for another page (via a link). Because of the short time interval between requests in the clickstream data the web server may ask if there were user interface events received between the two page requests. The absence of the user interface events can be used to indicate a computer event generator type.

Figure 9:
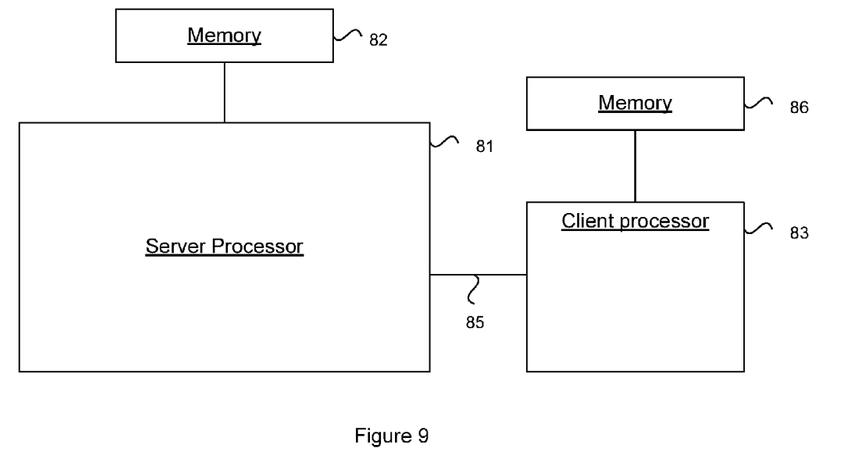
FIG. 9 illustrates a classification server processor and a webpage client processor.
Figure 10:
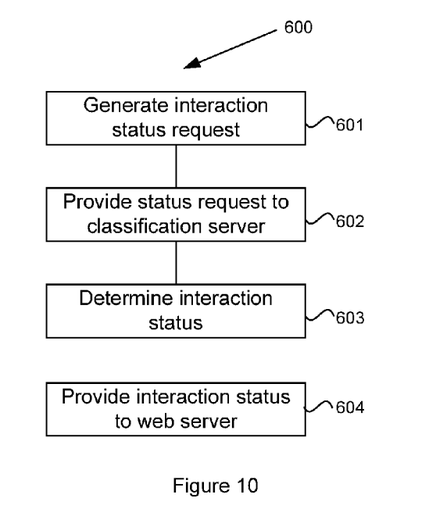
FIG. 10 illustrates an instruction set that may be executed on the processors of FIG. 9.

In one embodiment, the classification server 12 of FIG. 1 may include at least one processor 81 operatively associated with at least one memory 82, as shown in FIG. 9. The memory 82 may store instructions that are executable on the processor 81. The processor 81 may be in communication with a processor 83 of the web server 14. The web server processor 83 may also be operatively associated with a memory 86 that stores an instruction set for execution by the user processor 83. The classification server processor 81 may communicate with the web server processor 83 through an appropriate communications link 85 such as the internet. An instruction set that may be executed on the processors 81, 83 is depicted in the flowchart 600 of FIG. 10. In the combined instruction set, the web server processor 83 generates an interaction status request at step 601 for an interaction between a client and the web server, and passes the interaction status request to the classification server processor 81 at step 602. The classification server processor 81 determines the interaction status of the interaction at step 603, for example by referring to a client interaction buffer that stores event streams from the client to retrieve an associated interaction status. The interaction buffer may store an associated interaction status field from an ongoing status determination, or the interaction status may be determined by using the interaction buffer in the machine learning processes described above. Once the interaction status is determined, the classification server processor 81 returns the interaction status to the web server processor at step 604.

While the servers are depicted as a single entities, a person skilled in the art will readily understand that the servers may be provided as multiple servers or with multiple components and in a distributed form.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method of recording a web page interaction, the method comprising:
   identifying on a client a web page interaction of arbitrary unmodified web pages or web page application code with a web page server;
   recording an event generator type indicating a type of the web page interaction between a client and the web page server;
   generating an event stream message based on the web page interaction;
   recording client data from an event header message of the event stream message comprising an interaction ID uniquely identifying the web page interaction between the client and the web server and aids to identify a particular event stream of at least one of an operating system, browser type, client device type, and screen size;
   determining, from the event stream message, that the event generator type has changed since a previous interaction; and
   recording a new event generator type to reflect the changes.

2. The method of claim 1, wherein the event generator type is included in an event header message of an event stream message, the event generator type comprising at least one of a human interaction, a computer assisted human interaction, a computer-based interaction, a robot interaction, a natural action interaction, a simulated input device interaction, and a fluctuating input device interaction.

3. The method of claim 1, further comprising:
   recording event information based on a plurality of interactions from a plurality of different clients, the event information comprising at least one of: operating system type, browser type, and event generator type including human and computer initiated event generation.

4. The method of claim 1, further comprising:
   initiating a learning phase to record events observed during the web page interaction or plurality of web page interactions;
   recording and labeling the observed events; and
   utilizing the recorded events to determine whether subsequent web page interactions are human-based or computer-based interactions.

5. The method of claim 4, further comprising:
   retrieving an event stream message including at least one newly created event; and
   comparing the at least one newly created event to the recorded events to determine whether a match is made.

6. The method of claim 5, wherein determining whether a match is made comprises determining whether the comparing operation provides a degree of confidence above a predefined threshold.

7. An apparatus configured to record a web page interaction, the apparatus comprising:
   a memory configured to record an event generator type indicating a type of web page interaction between a client and a web page server; and
   a processor configured to
      identify on a client a web page interaction of arbitrary unmodified web pages or web page application code with a web page server;
      generate an event stream message based on the web page interaction;
      record client data from an event header message of the event stream message comprising an interaction ID that uniquely identifies the web page interaction between the client and the web server and aids to identify a particular event stream of at least one of an operating system, browser type, client device type, and screen size;
      determine from the event stream message that the event generator type has changed since a previous interaction; and
      record a new event generator type to reflect the changes.

8. The apparatus of claim 7, wherein the event generator type is included in an event header message of an event stream message, the event generator type comprising at least one of a human interaction, a computer assisted human interaction, a computer-based interaction, a robot interaction, a natural action interaction, a simulated input device interaction, and a fluctuating input device interaction.

9. The apparatus of claim 7, wherein the memory is further configured to record event information based on a plurality of interactions from a plurality of different clients, the event information comprising at least one of: operating system type, browser type, and event generator type including human and computer initiated event generation.

10. The apparatus of claim 7, wherein the processor is further configured to
    initiate a learning phase to record events observed during the web page interaction or plurality of web page interactions;
    record and labeling the observed events; and
    utilize the recorded events to determine whether subsequent web page interactions are human-based or computer-based interactions.

11. The apparatus of claim 10, wherein the processor is further configured to retrieve an event stream message including at least one newly created event; and compare the at least one newly created event to the recorded events to determine whether a match is made.

12. The apparatus of claim 11, wherein the processor is further configured to determine whether a match is made by determining whether the comparing operation provides a degree of confidence above a predefined threshold.

13. A non-transitory computer readable storage medium configured to store instructions that when executed cause a processor to perform recording a web page interaction, the processor being further configured to perform:

identifying on a client a web page interaction of arbitrary unmodified web pages or web page application code with a web page server;

recording an event generator type indicating a type of the web page interaction between a client and the web page server;

generating an event stream message based on the web page interaction;

recording client data from an event header message of the event stream message comprising an interaction ID uniquely identifying the web page interaction between the client and the web server and aids to identify a particular event stream of at least one of an operating system, browser type, client device type, and screen size;

determining, from the event stream message, that the event generator type has changed since a previous interaction; and recording a new event generator type to reflect the changes.

14. The non-transitory computer readable storage medium of claim 13, wherein the event generator type is included in an event header message of an event stream message, the event generator type comprising at least one of a human interaction, a computer assisted human interaction, a computer-based interaction, a robot interaction, a natural action interaction, a simulated input device interaction, and a fluctuating input device interaction.

15. The non-transitory computer readable storage medium of claim 13, wherein the processor is further configured to perform:

recording event information based on a plurality of interactions from a plurality of different clients, the event information comprising at least one of: operating system type, browser type, and event generator type including human and computer initiated event generation.

16. The non-transitory computer readable storage medium of claim 13, wherein the processor is further configured to perform:

initiating a learning phase to record events observed during the web page interaction or plurality of web page interactions;

recording and labeling the observed events; and utilizing the recorded events to determine whether subsequent web page interactions are human-based or computer-based interactions.

17. The non-transitory computer readable storage medium of claim 16, wherein the processor is further configured to perform:

retrieving an event stream message including at least one newly created event; and comparing the at least one newly created event to the recorded events to determine whether a match is made.

* * * * *